United States Patent Office 3,271,425
Patented Sept. 6, 1966

3,271,425
ANDROST-2-ENE-5α,17β-DIOL, 17-ALKYL DERIVATIVES CORRESPONDING AND ESTERS THEREOF
Paul D. Klimstra, Northbrook, Ill., assignor to G. D. Searle & Co., Chicago, Ill., a corporation of Delaware
No Drawing. Filed Oct. 13, 1964, Ser. No. 403,650
7 Claims. (Cl. 260—397.4)

The present invention is concerned with novel bisoxygenated steroids characterized by a 5α-hydroxy function and, more particularly, with androst-2-ene-5α,17β-diol, 17-alkyl derivatives corresponding and esters thereof. The compounds within the scope of the following formulas

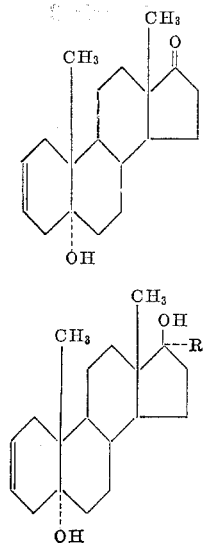

wherein R is hydrogen or a lower alkyl radical, together with the corresponding 17-(alkanoates), more specifically define the present invention.

The lower alkyl radicals symbolized by R are typified by methyl, ethyl, propyl, butyl, pentyl, hexyl and the branched-chain radicals thereof. Examples of the 17-(lower alkanoates) are the acetate, propionate, butyrate, valerate, caproate and the branched-chain esters isomeric therewith.

The 17-ketals of 4α,5α-epoxy-3β-hydroxyandrostan-17-one serve as convenient starting materials in the manufacture of the instant substances. Reaction of the ethylene ketal, for example, with a suitable reducing agent such as lithium aluminum hydride results in appearance of the 5α-hydroxy group, thus affording 3β,5α-dihydroxyandrostan-17-one 17-ethylene ketal. Selective acylation of the hydroxy function at carbon atom 3, typically with p-toluenesulfonyl chloride, affords 3β-(p-toluenesulfonyloxy)-5α-hydroxyandrostan-17-one 17-ethylene ketal. The carbonyl protecting group is then removed, preferably by reaction with dilute hydrochloric acid, and the resulting 17-ketone is pyrolized by heating in a high boiling solvent such as collidine to afford the instant 5α-hydroxyandrost-2-en-17-one. The carbonyl function of that substance can be reduced without affecting the Δ² unsaturated linkage, typically with sodium borohydride in aqueous isopropyl alcohol, to afford androst-2-ene-5α,17β-diol. Selective acylation of the 17-hydroxy function can be effected by reaction of the latter substance with a lower alkanoic acid anhydride in the presence of a suitable acid acceptor at or near room temperature. Reaction of that diol with acetic anhydride and pyridine thus affords androst-2-ene-5α,17β-diol 17-acetate.

The instant 17-alkylated compounds can be obtained by reaction of the aforementioned 5α-hydroxyandrost-2-en-17-one with an alkyl organometallic reagent. A suitable process is exemplified by reaction of that 17-one with methyl magnesium bromide in ether followed by decomposition of the adduct in aqueous ammonium chloride to produce 17α-methylandrost-2-ene-5α,17β-diol.

The compounds of this invention are useful in consequence of their valuable pharmacological properties. They are, for example, harmonal and anti-hormonal agents, as is evidenced by their anabolic, androgenic and anti-estrogenic properties.

The invention will appear more fully from the examples which follow. These examples are given by way of illustration only, and are not to be construed as limiting the invention either in spirit or in scope, as many modifications both in materials and methods will be apparent to those skilled in the art. In these examples, temperatures are given in degrees centigrade (° C.) and quantities of materials in parts by weight, unless otherwise noted.

Example 1

To a solution of 19 parts of 4α,5α-epoxy-3β-hydroxyandrostan-17-one 17-ethylene ketal in 150 parts of dioxane is added, over a period of about one hour with stirring, a solution of 6 parts of lithium aluminum hydride in 150 parts of dioxane. The resulting reaction mixture is heated at reflux temperature for about 2 hours, then is cooled and successively diluted with a solution of 6 parts of water in 30 parts of dioxane, 4.5 parts by volume of 20% aqueous sodium hydroxide, and 20.4 parts of water. The resulting precipitated inorganic salts are removed by filtration and washed on the filter with dioxane. The filtrate and washings are combined and stripped of solvent under reduced pressure to afford the crude product as a white solid. Recrystallization from acetone affords pure 3β,5α-dihydroxyandrostan-17-one 17-ethylene ketal, melting at about 218–220.5°.

Example 2

A mixture of 17 parts of 3β,5α-dihydroxyandrostan-17-one 17-ethylene ketal, 17 parts of p-toluenesulfonyl chloride and 200 parts of pyridine is kept at room temperature, in an atmosphere of nitrogen, for about 16 hours. The reaction mixture is then diluted with water and extracted with a 1:1 mixture of ether and ethyl acetate. The organic extracts are combined, then washed successively with water, 5% hydrochloric acid, water, and 5% aqueous sodium bicarbonate. Decolorization of the washed solution with activated carbon followed by evaporation of the solvent under reduced pressure affords the solid product. Recrystallization from aqueous acetone results in pure 5α-hydroxy - 3β - (p-toluenesulfonyloxy)androstan-17-one 17-ethylene ketal, melting at about 144–146.5° with decomposition. This compound is characterized further by an optical rotation, in chloroform, of —24°.

Example 3

To a solution of 10 parts of 5α-hydroxy-3β-(p-toluenesulfonyloxy)androstan-17-one 17-ethylene ketal in 800 parts of ethanol is added a solution of 13.2 parts of concentrated hydrochloric acid in 200 parts of water. The resulting reaction mixture is stirred at room temperature for about 3 hours, then is neutralized by the addition of a solution of 15 parts of sodium bicarbonate in 300 parts of water. An additional 50 parts of water is then added. The resulting aqueous mixture is concentrated to a small volume and is poured carefully into a mixture of ice and water. The precipitate which forms is collected by filtration, washed with water, and dried in air to afford 5α-hydroxy-3β-(p-toluenesulfonyloxy)-androstan-17-one, which is characterized by infrared absorption maxima at about 2.75, 3.41, 5.75, 6.26, and 8.5 microns.

Example 4

A solution of 5 parts of 5α-hydroxy-3β-(p-toluenesulfonyloxy)androstan-17-one in 250 parts by volume of freshly distilled collidine is heated at the reflux temperature for about 9 hours, then is cooled and poured into a mixture of ice and water containing 92 parts of concentrated sulfuric acid. The resulting gummy product is extracted with ether, and the ether solution is washed successively with 10% sulfuric acid and 5% aqueous sodium bicarbonate. Drying over anhydrous sodium sulfate containing activated carbon followed by removal of the solvent by distillation under reduced pressure affords an oily residue which partially solidifies upon standing. This material is purified further by dissolution in ether and decolorization with activated carbon. Removal of the solvent by distillation under reduced pressure affords a yellow solid which is recrystallized from hexane to afford pure 5α-hydroxyandrost-2-en-17-one, melting at about 126–130°. This compound is further characterized by the following structural formula

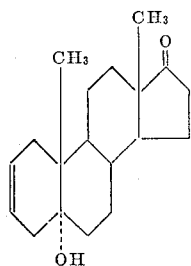

Example 5

To a solution of one part of 5α-hydroxyandrost-2-en-17-one in 35 parts of ether is added 20 parts of 3 molar ethereal methyl magnesium bromide, and the resulting reaction mixture is heated with stirring at the reflux temperature for about 20 hours. The reaction mixture is then cooled and poured carefully into a mixture of ice and water containing ammonium chloride. The resulting aqueous mixture is made acidic by the addition of hydrochloric acid, then is extracted with ether. The ether extracts are washed with 5% aqueous sodium bicarbonate, then dried over anhydrous potassium carbonate containing activated carbon. Removal of the solvent by distillation under reduced pressure affords a glass-like residue which is recrystallized from aqueous methanol to afford 17α-methylandrost-2-ene-5α,17β-diol, melting at about 126–128°. In chloroform, this compound exhibits an optical rotation of +10.5°. It can be represented by the following structural formula

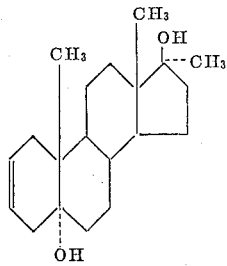

Example 6

The substitution of an equivalent quantity of ethyl magnesium bromide in the procedure of Example 5 results in a 17α-ethylandrost-2-ene-5α,17β-diol.

Example 7

A mixture of 2.75 parts of 5α-hydroxyandrost-2-en-17-one, 2.75 parts of sodium borohydride, 96 parts of isopropyl alcohol and 3.5 parts of water is stirred at room temperature for about 2½ hours, then is poured into a mixture of ice and water. The resulting precipitate is collected by filtration, washed with water, and dried in air to afford the crude product. Recrystallization from aqueous acetone results in pure androst-2-ene-5α,17β-diol, melting at about 162–163°. Infrared absorption maxima, in chloroform, are observed at about 2.75, 3.41, and 5.75 microns. This compound is characterized further by the following structural formula

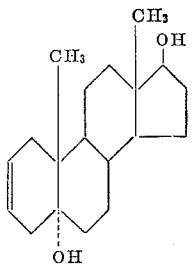

Example 8

A mixture of 7 parts of androst-2-ene-5α,17β-diol, 100 parts of pyridine and 50 parts of acetic anhydride is kept at room temperature for about 16 hours, then is poured carefully into a mixture of ice and water. The resulting precipitate is collected by filtration, washed on the filter with water, and dried in air, then recrystallized from aqueous methanol, thus affording pure androst-2-ene-5α,17β-diol 17-acetate, melting at about 139–142°. In chloroform, this substance displays an optical rotation of −97.8°. It is characterized further by the following structural formula

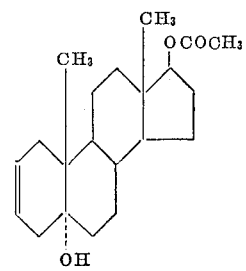

Example 9

The substitution of an equivalent quantity of propionic anhydride in the procedure of Example 8 results in androst-2-ene-5α,17β-diol 17-propionate.

What is claimed is:
1. A member selected from the class consisting of compounds represented by the formulas

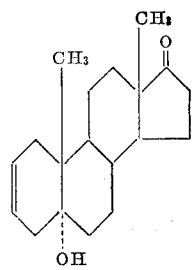

and

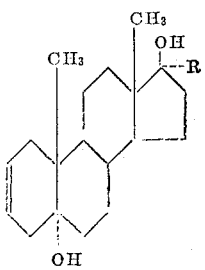

together with the 17-(lower alkanoates) corresponding, wherein R is selected from the group consisting of hydrogen and a lower alkyl radical.
2. A compound of the formula
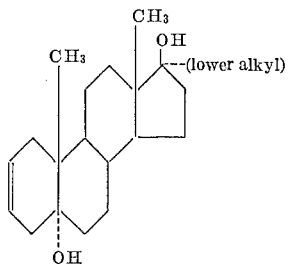
3. A compound of the formula
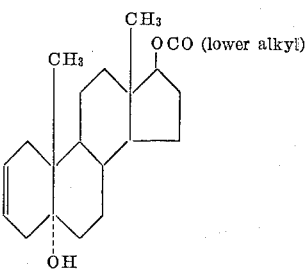
4. 5α-hydroxyandrost-2-en-17-one.
5. Androst-2-ene-5α,17β-diol.
6. 17α-methylandrost-2-ene-5α,17β-diol.
7. Androst-2-ene-5α,17β-diol 17-acetate.
No references cited.
LEWITS GOTTS, *Primary Examiner.*